3,625,674
GOLD RECOVERY PROCESS

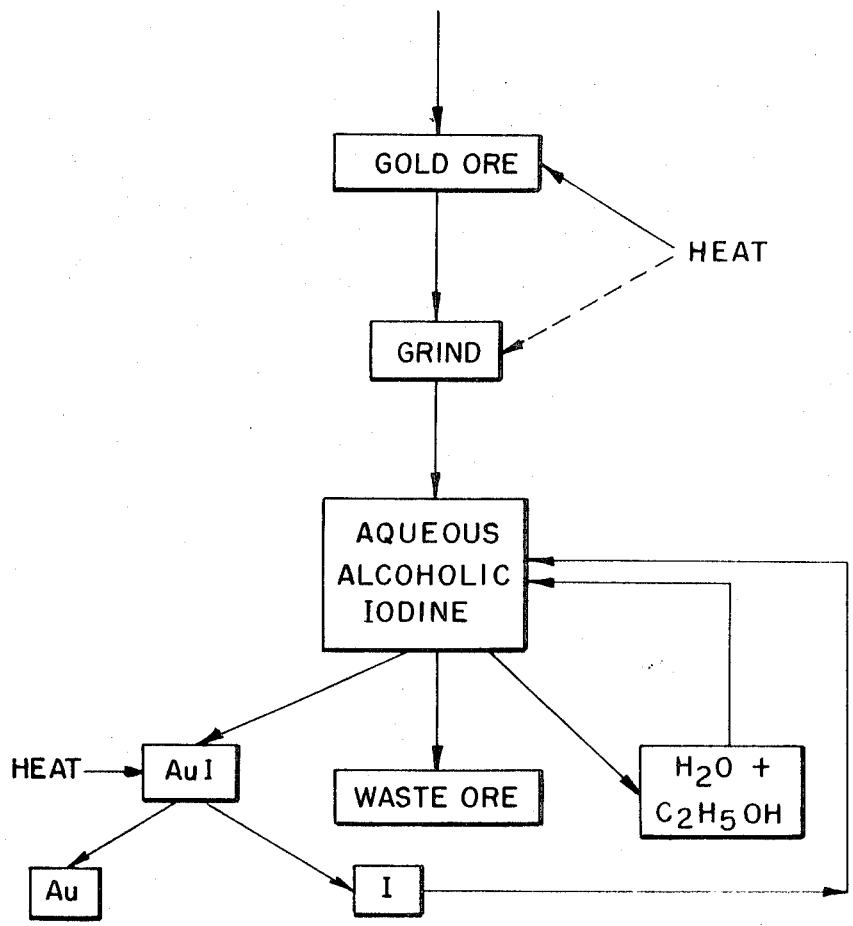

Albert L. Jacobs, 521 5th Ave., New York, N.Y. 10017
Filed Apr. 10, 1969, Ser. No. 815,113
Int. Cl. C22b *11/04*
U.S. Cl. 75—101                                        5 Claims

ABSTRACT OF THE DISCLOSURE

Gold is extracted and isolated from gold-containing materials by reacting the gold with aqueous alcoholic iodine to form aurous iodide, AuI, which is separated and heated to break down the AuI into Au and I, thereafter isolating the Au and recovering the I for recycling to form AuI with the gold in additional gold-containing material.

---

This invention relates to a method of extracting and isolating gold from any suitable gold-containing material in which the gold is present in the free state; i.e., chemically uncombined and the starting material may, for example, be any of those set forth in my co-pending application 740,460 filed June 27, 1968, now Pat. No. 3,545,965, granted Dec. 8, 1970. The preferred material is a lean gold ore which is subjected to grinding to put it in a fine state of subdivision and which is heated before, during or after grinding to break down and drive off organic matter and volatiles. The temperature need not be accurately controlled but may merely be any elevated temperature below that at which the ore fuses or waste heat is available. The gold is extracted by chemically combining it with iodine, suitably in an aqueous alcoholic solution of iodine whereby aurous iodide AuI is formed which is a white or lemon colored powder insoluble in water.

The alluvial deposit, ore or concentrate or the "tailings" from the cyanide process, all of which may be used as starting materials, are brought into contact with the aqueous alcoholic iodine solution and the AuI which forms separates or is separated as by precipitation with added water and then subjected to sufficient heat to drive off the water and alcohol and then the iodine leaving the gold behind as a substantially pure deposit or residue. The heating need only be to a temperature which causes the alcohol and water to volatilize and then the AuI to break down into Au and I and this is carried out by raising the temperature to approximately 100° C. and then to 120° C. The source of heat will ordinarily be waste heat at the mining or ore beneficiating site.

In accordance with the invention, finely subdivided gold-containing material is passed on a conveyor through a trough or other receptacle containing aqueous alcoholic iodine solution. The gold in the finely subdivided gold-containing material combines with the iodine to form AuI which becomes separated from the residue on the conveyor which passes beyond the receptacle to discharge the extracted material as waste and the AuI is collected and heated to a temperature of approximately 120° C. whereupon the AuI breaks down and the iodine is recovered or it is sublimed onto any suitable adjacent cooler surface from which it can be reclaimed and reused by dissolving it in aqueous alcohol to form more aqueous alcoholic iodine solution. The alcohol or some of it may be lost, but can be and preferably is passed into a condenser so as to obtain for reuse at least a large part of the aqueous alcohol which is then recycled back into the trough or receptacle along with the recovered iodine for reuse and in this way effecting important economies which are desirable due to the fact that one of the main objects of the present invention is to obtain that relatively small amount of gold existing in lean otherwise uncommercial ores, or gold-containing material such as the "tailings" left over from the cyanide or mercury amalgam process. The process of this invention can be carried out batchwise if desired, but is preferably continuous.

The accompanying flowsheet drawing illustrates the sequence of steps.

The iodine which is used for the reaction is in elemental form; i.e., as molecular $I_2$ or atomic iodine I which, however, is ordinarily used in solution in aqueous alcohol of any suitable concentration which is not critical but which should not be any more dilute than necessary to dissolve the required amount of iodine. It is highly important that the gold-containing material be pre-ground to a fine state of subdivision because while gold in alluvial or other ore deposit form is normally in the free; i.e., chemically uncombined, state, it is often entrapped or occluded within earthy particles which would prevent access of the solvent-reactant to the gold. The precise particle size of the pre-ground material is not critical but should be sufficiently small to free all the entrapped or occluded gold. It is best not to subdivide the material more finely than is necessary because the "fines" are more difficult to handle than larger particles. The amount of iodine used is substantially the stoichiometric amount to form AuI with the amount of gold in a particular material being treated and which can be readily determined by simple test or microscopic examination and estimation, but it is preferred to use a slight excess of the stoichiometric amount of iodine required by the formula AuI as in this way more complete extraction and recovery of the gold content of the gold-containing material is assured. The process can be represented as follows:

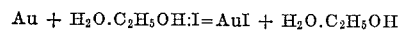

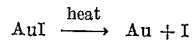

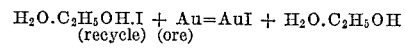

The AuI obtained by the above process is especially suitable for forming other gold compounds for use in the industrial arts such as gold sodium thiomalate

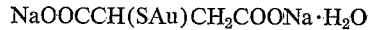

which is a valuable and useful gold compound very soluble in water, practically insoluble in ethanol and whose 5% aqueous solution has a pH in the range of 5.8 to 6.5. Gold sodium thiomalate can be readily prepared by reacting sodium thiomalate with a gold halide, in this instance with aurous iodide. Thus the AuI is not only useful in the isolation or recovery of gold from gold-containing materials, but forms a key intermediate in the production of gold compounds, particularly organic gold compounds. The gold recovered is of course useful as such and for usual industrial purposes. It is to be understood that the entire process or at least that portion of it which involves the heating of the aqueous alcoholic iodine solution is carried out in an enclosed space or within a tunnel-like chamber so as to conserve the ethyl or isopropyl alcohol which is present and to cut down on losses thereof into the atmosphere.

What is claimed is:

1. A method of extracting and isolating gold from a material containing uncombined gold which comprises reacting iodine in aqueous alcoholic solution with the uncombined gold in the gold-containing material to form AuI, separating the AuI and heating it to a temperature sufficient to break it down into Au and I, isolating the Au and recovering the I for recycling to form AuI with the uncombined gold in additional gold-containing material.

2. A method according to claim 1 wherein the heating is carried out in two stages to drive off the aqueous alcohol at about 100° C. and to break down the AuI at about 120° C.

3. A method according to claim 1 wherein the iodine used for the reaction is in the form of elemental iodine.

4. A method according to claim 1 wherein the gold-containing material is pre-ground to ensure that its gold content is physically free.

5. A method according to claim 1 wherein the amount of iodine used for the reaction is slightly in excess of the stoichiometric amount required by the formula AuI.

References Cited

UNITED STATES PATENTS

| 861,535 | 7/1907 | Pritchard | 75—118 |
|---|---|---|---|
| 1,944,213 | 3/1935 | Delépine | 260—430 |
| 2,304,823 | 12/1942 | Harrison | 75—118 |

OTHER REFERENCES

Sneed et al.: Comprehensive Inorganic Chemistry, vol. 2, D. Van Nostrand Co., N.Y., 1954, p. 229.

HYLAND BIZOT, Primary Examiner

G. T. OZAKI, Assistant Examiner

U.S. Cl. X.R.

75—118